(12) United States Patent
Kato (10) Patent No.: US 12,205,769 B2
(45) Date of Patent: Jan. 21, 2025

(54) MULTILAYER CERAMIC CAPACITOR

(71) Applicant: TAIYO YUDEN CO., LTD., Tokyo (JP)

(72) Inventor: Yoichi Kato, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 126 days.

(21) Appl. No.: 18/066,905

(22) Filed: Dec. 15, 2022

(65) Prior Publication Data
US 2023/0207216 A1    Jun. 29, 2023

(30) Foreign Application Priority Data

Dec. 28, 2021 (JP) .................................. 2021-214546

(51) Int. Cl.
| | |
|---|---|
| H01G 4/30 | (2006.01) |
| H01G 4/008 | (2006.01) |
| H01G 4/012 | (2006.01) |
| H01G 4/12 | (2006.01) |
| H01G 4/224 | (2006.01) |

(52) U.S. Cl.
CPC ............... *H01G 4/30* (2013.01); *H01G 4/008* (2013.01); *H01G 4/012* (2013.01); *H01G 4/1227* (2013.01); *H01G 4/224* (2013.01)

(58) Field of Classification Search
CPC .......... H01G 4/30; H01G 4/008; H01G 4/012; H01G 4/1227; H01G 4/224
USPC ................. 361/301.4, 321.1, 321.4, 311, 312
See application file for complete search history.

(56) References Cited

U.S. PATENT DOCUMENTS

| | | | |
|---|---|---|---|
| 2012/0234462 A1 | 9/2012 | Matsui et al. | |
| 2014/0160627 A1* | 6/2014 | Kobayashi | H01G 4/2325 |
| | | | 361/303 |
| 2014/0177130 A1* | 6/2014 | Park | H01G 4/30 |
| | | | 361/301.4 |
| 2018/0151295 A1* | 5/2018 | Iwai | H01G 2/065 |
| 2019/0180936 A1* | 6/2019 | Cha | C04B 35/47 |
| 2020/0035416 A1* | 1/2020 | Kwon | H01G 4/30 |
| 2020/0111613 A1* | 4/2020 | Teraoka | H01G 4/012 |

FOREIGN PATENT DOCUMENTS

JP         2012209539 A      10/2012

* cited by examiner

*Primary Examiner* — Arun Ramaswamy
(74) *Attorney, Agent, or Firm* — Law Office of Katsuhiro Arai (57) ABSTRACT

A multilayer ceramic capacitor includes a multilayer body including ceramic layers, internal electrodes and a pair of side surfaces, and side margin portions, wherein each of ceramic layers and the side margin portions is composed of a polycrystalline body having a perovskite structure, wherein the side margin portions contain at least one of calcium and strontium, when the side margin portions contain calcium, an atomic ratio of the calcium to titanium in the side margin portions is greater than that in the ceramic layers, and when the side margin portions contains strontium, the atomic ratio of the strontium to titanium in the side margin portions is greater than that in the ceramic layers, wherein glass particles composed of silicon as a main component are dispersed in the polycrystalline body, and an atomic ratio of silicon to titanium is 1 at % or more and 10 at % or less.

8 Claims, 6 Drawing Sheets

MULTILAYER CERAMIC CAPACITOR

CROSS-REFERENCE TO RELATED APPLICATION

This application is based upon and claims the benefit of priority of the prior Japanese Patent Application No. 2021-214546, filed on Dec. 28, 2021, the entire contents of which are incorporated herein by reference.

FIELD

A certain aspect of the present disclosure relates to a multilayer ceramic capacitor in which side margin portions are retrofitted.

BACKGROUND

There is known a technique of retrofitting side margin portions in the process of manufacturing a multilayer ceramic capacitor (for example, see Patent Document 1: Japanese Laid-open Patent Publication No. 2012-209539). This technique is advantageous in reducing the size and increasing the capacity of the multilayer ceramic capacitor because both side end portions of a plurality of internal electrodes can be reliably covered with thin side margin portions.

As an example, in the method of manufacturing the multilayer ceramic capacitor described in Patent Document 1, a multilayer sheet in which ceramic sheets on which internal electrodes are printed are laminated is cut to produce a plurality of multilayer bodies having cut surfaces on which a plurality of internal electrodes are exposed as side surfaces. Then, the side margin portions are formed on both side surfaces of the multilayer body by punching out the ceramic sheet at the side surfaces of the multilayer body.

SUMMARY OF THE INVENTION

The present disclosure has a purpose of providing a multilayer ceramic capacitor having high reliability.

According to an aspect of the present invention, there is provided a multilayer ceramic capacitor including: a multilayer body including: a plurality of ceramic layers laminated in a first direction; a plurality of internal electrodes each positioned between the plurality of ceramic layers; and a pair of side surfaces perpendicular to a second direction perpendicular to the first direction and on which end portions of the plurality of internal electrodes in the second direction are positioned; and a pair of side margin portions covering the pair of side surfaces; wherein each of the plurality of ceramic layers and the pair of side margin portions is composed of a polycrystalline body having a perovskite structure including barium in an A site and titanium in a B site, wherein the A site in the pair of side margin portions contains at least one of calcium and strontium, when the A site in the pair of side margin portions contains calcium, an atomic ratio of the calcium in the A site to titanium in the B site in the pair of side margin portions is greater than that in the plurality of ceramic layers, and when the A site in the pair of side margin portions contains strontium, the atomic ratio of the strontium in the A site to the titanium in the B site in the pair of side margin portions is greater than that in the plurality of ceramic layers, wherein a plurality of glass particles composed of silicon as a main component are dispersed in the polycrystalline body, and an atomic ratio of silicon to titanium in the B site is 1 at % or more and 10 at % or less.

In the pair of side margin portions, the atomic ratio of calcium in the A site to titanium in the B site may be 0.1 at % or more and 10 at % or less. In the pair of side margin portions, the atomic ratio of strontium in the A site to titanium in the B site may be 0.1 at % or more and 10 at % or less. In the pair of side margin portions, a total atomic ratio of barium, calcium and strontium in the A site to titanium in the B site may be 95 at % or more and 110 at % or less. The atomic ratio of silicon to titanium in the B site in the pair of side margin portions may be larger than that in the plurality of ceramic layers. In the pair of side margin portions, the atomic ratio of silicon to titanium in the B site may be larger than a total atomic ratio of calcium and strontium in the A site to titanium in the B site.

According to another aspect of the present invention, there is provided a multilayer ceramic capacitor including: a multilayer body including: a plurality of ceramic layers laminated in a first direction; a plurality of internal electrodes each positioned between the plurality of ceramic layers; and a pair of side surfaces perpendicular to a second direction perpendicular to the first direction and on which end portions of the plurality of internal electrodes in the second direction are positioned; and a pair of side margin portions covering the pair of side surfaces; wherein each of the plurality of ceramic layers and the pair of side margin portions is composed of a polycrystalline body having a perovskite structure including barium and titanium, wherein the pair of side margin portions contain at least one of calcium and strontium, when the pair of side margin portions contains calcium, an atomic ratio of the calcium to titanium in the pair of side margin portions is greater than that in the plurality of ceramic layers, and when the pair of side margin portions contains strontium, the atomic ratio of the strontium to titanium in the pair of side margin portions is greater than that in the plurality of ceramic layers, wherein a plurality of glass particles composed of silicon as a main component are dispersed in the polycrystalline body, and an atomic ratio of silicon to titanium is 1 at % or more and 10 at % or less.

DETAILED DESCRIPTION

In the multilayer ceramic capacitor as described above, due to a stress applied when cutting the multilayer sheet, the intervals between the ends of the plurality of internal electrodes on the side surfaces of the multilayer body are likely to become uneven. Therefore, in such a multilayer ceramic capacitor, the electric field is concentrated at the end portions of the plurality of internal electrodes, which tends to cause defects such as a decrease in insulation resistance.

Hereinafter, a multilayer ceramic capacitor 10 according to an embodiment of the present disclosure will be described with reference to the drawings. In the drawings, an X-axis, a Y-axis and a Z-axis orthogonal to each other are illustrated as appropriate. The X-axis, the Y-axis and the Z-axis define a fixed coordinate system that is fixed with respect to the multilayer ceramic capacitor 10.

[Basic Configuration of Multilayer Ceramic Capacitor 10]

Figure 1:
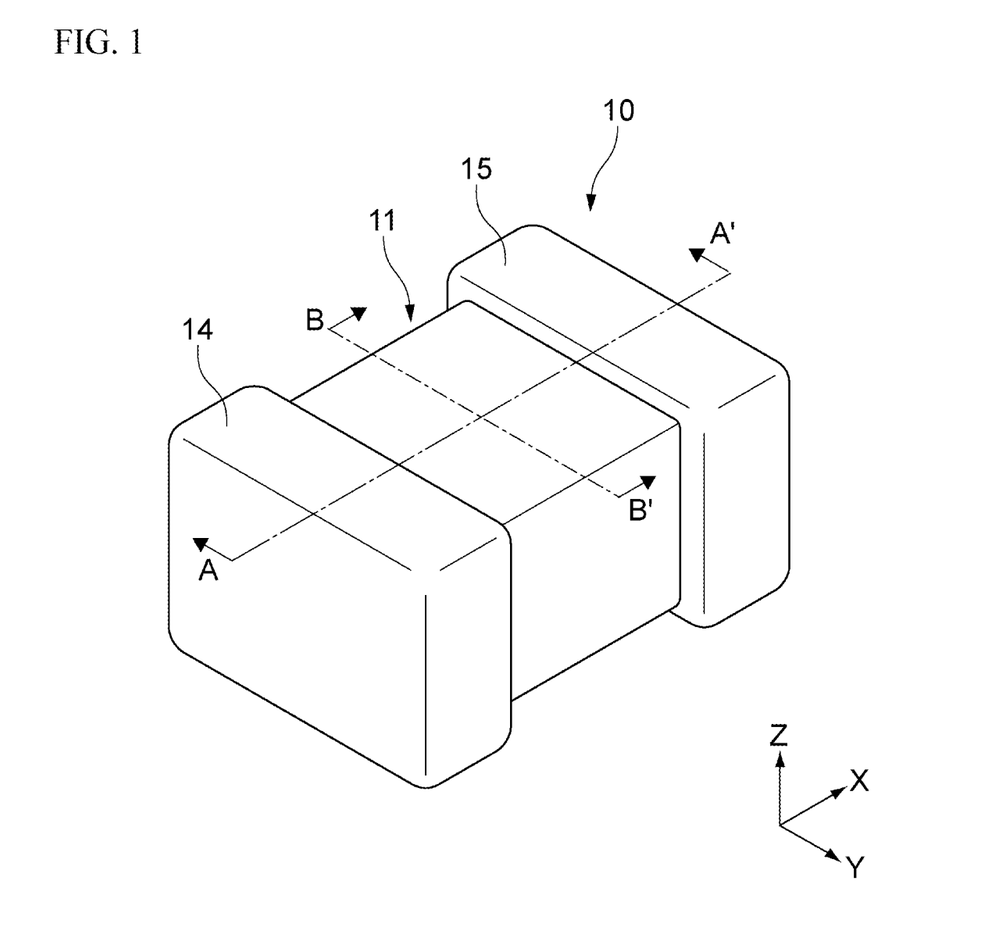
FIG. 1 is a perspective view of a multilayer ceramic capacitor according to an embodiment of the present disclosure.
Figure 2:
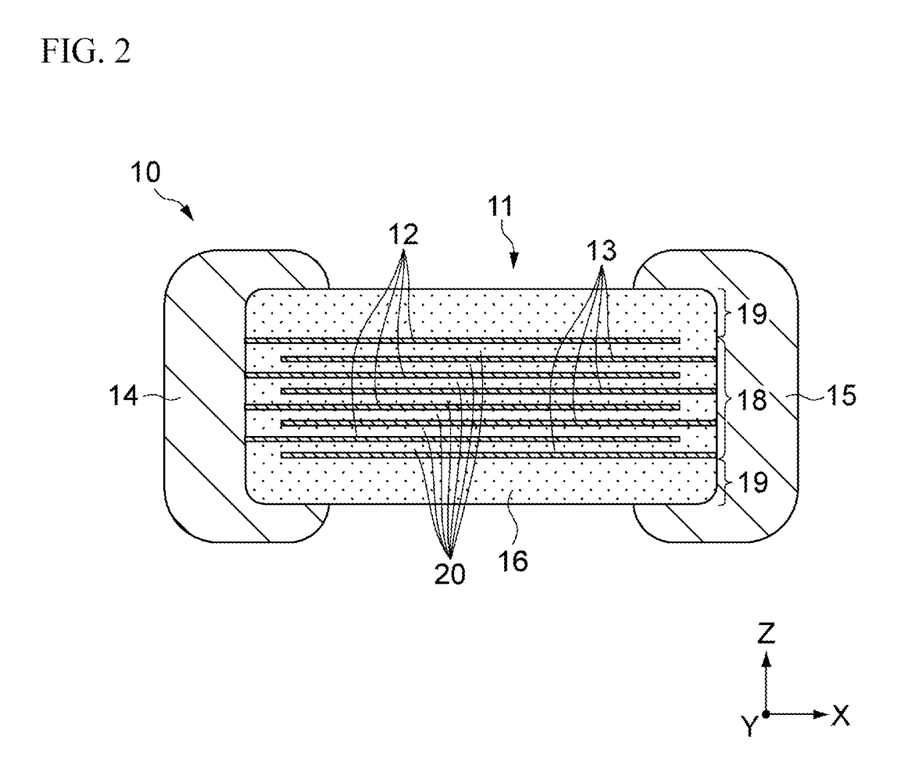
FIG. 2 is a cross-sectional view of the multilayer ceramic capacitor taken along line A-A' in FIG. 1.
Figure 3:
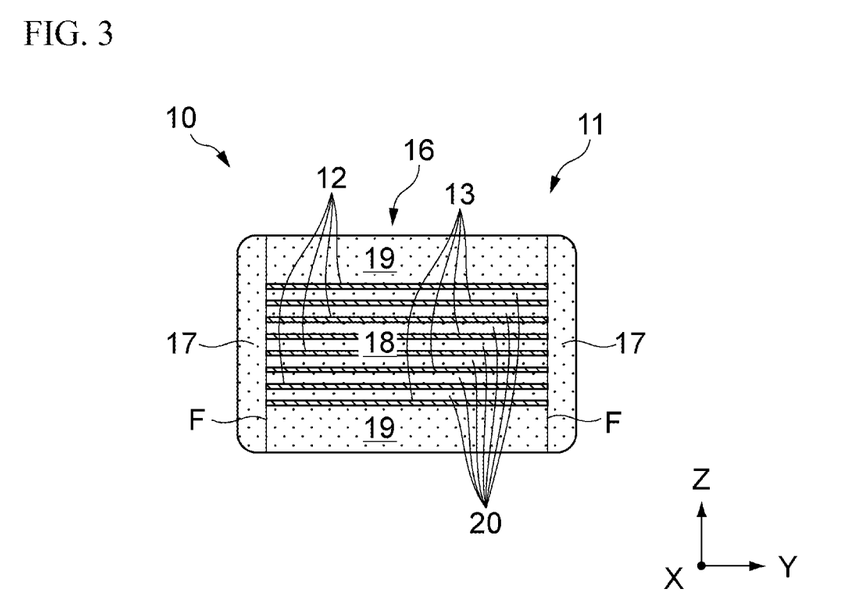
FIG. 3 is a cross-sectional view of the multilayer ceramic capacitor taken along line B-B' of FIG. 1.

FIGS. 1 to 3 are views illustrating the multilayer ceramic capacitor 10 according to an embodiment of the present disclosure. FIG. 1 is a perspective view of the multilayer ceramic capacitor 10. FIG. 2 is a cross-sectional view of the multilayer ceramic capacitor 10 taken along line A-A' in FIG. 1. FIG. 3 is a cross-sectional view of the multilayer ceramic capacitor 10 taken along line B-B' in FIG. 1.

The multilayer ceramic capacitor 10 includes a ceramic body 11, a first external electrode 14, and a second external electrode 15. The ceramic body 11 is configured as a hexahedron having a pair of end surfaces perpendicular to the X-axis, a pair of side surfaces perpendicular to the Y-axis, and a pair of main surfaces perpendicular to the Z-axis. The external electrodes 14 and 15 cover the pair of end surfaces of the ceramic body 11.

The pair of end surfaces, the pair of side surfaces, and the pair of main surfaces of the ceramic body 11 are all configured as flat surfaces. The flat surface according to the present embodiment does not have to be exactly flat as long as it is recognized as flat when viewed as a whole, and includes, for example, a surface having a minute uneven shape or a gently curved shape existing in a predetermined range.

The external electrodes 14 and 15 face each other in the X-axis direction across the ceramic body 11. The external electrodes 14 and 15 extend from the respective end surfaces of the ceramic body 11 to the main surfaces and the side surfaces. Thus, in the external electrodes 14 and 15, both of a cross section parallel to an X-Z plane and a cross section parallel to an X-Y plane are U-shaped.

Note that the shapes of the external electrodes 14 and 15 are not limited to those illustrated in FIG. 1. For example, the external electrodes 14 and 15 may extend from both end surfaces of the ceramic body 11 to only one main surface and have an L-shaped cross section parallel to the X-Z plane. Further, the external electrodes 14 and 15 does not need to extend to any of the main surfaces and the side surfaces.

The external electrodes 14 and 15 are made of a good electrical conductor. Examples of the good electrical conductor forming the external electrodes 14 and 15 include a metal containing copper (Cu), nickel (Ni), tin (Sn), palladium (Pd), platinum (Pt), silver (Ag), gold (Au) or the like, as a main component, or an alloy of these metals. In this embodiment, the main component refers to a component having the highest content ratio.

The ceramic body 11 has a multilayer body 16 and a pair of side margin portions 17. The multilayer body 16 constitutes a pair of main surfaces and a pair of end surfaces of the ceramic body 11 and has a pair of side surfaces F perpendicular to the Y-axis. The pair of side margin portions 17 respectively cover the pair of side surfaces F of the multilayer body 16 and constitute the pair of side surfaces of the ceramic body 11.

The multilayer body 16 has a configuration in which a plurality of flat plate-shaped ceramic layers 20 extending along the X-Y plane are laminated in the Z axis direction. The multilayer body 16 has a capacitance forming portion 18 and a pair of cover portions 19. The pair of cover portions 19 cover the capacitance forming portion 18 from above and below in the Z-axis direction, and constitute a pair of main surfaces of the ceramic body 11.

The capacitance forming portion 18 has a plurality of sheet-shaped first internal electrodes 12 and a plurality of sheet-shaped second internal electrodes 13 extending along the X-Y plane and arranged between the plurality of ceramic layers 20. The internal electrodes 12 and 13 are alternately arranged along the Z-axis direction. That is, in the capacitance forming portion 18, the internal electrodes 12 and 13 face each other in the Z-axis direction across the ceramic layer 20.

The first internal electrode 12 is drawn out to the end surface covered with the first external electrode 14. On the other hand, the second internal electrode 13 is drawn out to the end surface covered with the second external electrode 15. Thereby, the first internal electrode 12 is connected only to the first external electrode 14, and the second internal electrode 13 is connected only to the second external electrode 15.

The internal electrodes 12 and 13 are formed over the entire width of the capacitance forming portion 18 in the Y-axis direction, and both ends of the internal electrodes 12 and 13 in the Y-axis direction are located on both side surfaces F of the multilayer body 16. Thereby, in the ceramic body 11, the positions of the ends of the plurality of internal electrodes 12 and 13 in the Y-axis direction are aligned within a range of 0.5 μm or less in the Y-axis direction on both side surfaces F of the multilayer body 16.

The internal electrodes 12 and 13 are made of a good electrical conductor. The good electrical conductor forming the internal electrodes 12 and 13 typically includes nickel (Ni), and also includes a metal containing copper (Cu), palladium (Pd), platinum (Pt), silver (Ag), gold (Au) or the like, as a main component, or an alloy of these metals.

With such a configuration, in the multilayer ceramic capacitor 10, when a voltage is applied between the first external electrode 14 and the second external electrode 15, the voltage is applied to the plurality of ceramic layers 20 between the first internal electrode 12 and the second internal electrode 13. This allows the multilayer ceramic capacitor 10 to store electric charges corresponding to the voltage between the first external electrode 14 and the second external electrode 15.

[Configuration of Ceramic Layer 20 and Side Margin Portion 17]

(Schematic Configuration)

In the ceramic body 11 of the multilayer ceramic capacitor 10, the plurality of ceramic layers 20, a pair of cover portions 19, and a pair of side margin portions 17 are all composed of polycrystalline bodies of dielectric ceramics having a perovskite structure. The perovskite structure is composed of an A site, a B site and oxygen (O), and is represented by a general formula $ABO_3$.

In the ceramic body 11, the polycrystalline bodies constituting the plurality of ceramic layers 20, the pair of cover portions 19, and the pair of side margin portions 17 are all composed of a barium titanate ($BaTiO_3$) based material with which a high specific dielectric constant can be easily obtained. That is, the polycrystalline bodies have the perovskite structure containing barium in the A site and titanium in the B site.

In the multilayer ceramic capacitor 10, the compositions of polycrystalline bodies constituting the plurality of ceramic layers 20 and the side margin portions 17 are mutually different. More specifically, the polycrystalline body constituting the plurality of ceramic layers 20 has a composition emphasizing a specific dielectric constant, and the polycrystalline body constituting the side margin portions 17 has a composition emphasizing a withstand voltage.

In the multilayer ceramic capacitor 10, a large capacitance can be obtained by forming the plurality of ceramic layers 20 with the polycrystalline body having the high specific dielectric constant. On the other hand, in the multilayer ceramic capacitor 10, the polycrystalline body constituting the side margin portions 17 which do not contribute to the formation of the capacitance has a composition which pursues the high withstand voltage without being concerned with the specific dielectric constant.

Thus, in the multilayer ceramic capacitor 10, even if an electric field is concentrated at the ends of the internal electrodes 12 and 13 located on the side surfaces F of the multilayer body 16, defects such as a decrease in insulation resistance are less likely to occur due to the action of the side margin portions 17 having the high withstand voltage. That is, in the multilayer ceramic capacitor 10, the reliability can be improved without sacrificing the capacitance.

(Detailed Configuration)

The polycrystalline bodies constituting the plurality of ceramic layers 20 and the side margin portions 17 in the ceramic body 11 differ from each other in the composition of the A site of the perovskite structure, and specifically in an amount of calcium substituting for barium in the A site of the perovskite structure. That is, the amount of calcium titanate ($CaTiO_3$) to be solid-solved with respect to barium titanate is different.

Calcium titanate has a lower specific dielectric constant and a higher withstand voltage than barium titanate. Therefore, in the polycrystalline body, the more calcium is contained in the A site, the lower the specific dielectric constant and the higher the withstand voltage. Therefore, the balance between the specific dielectric constant and the withstand voltage can be adjusted by the amount of calcium in the A site.

In the polycrystalline body constituting the plurality of ceramic layers 20 contributing to the formation of the capacitance, it is preferable that the amount of calcium in the A site is reduced and the A site does not substantially contain calcium. As a result, in the multilayer ceramic capacitor 10, a large capacitance can be obtained by the action of the plurality of ceramic layers 20 composed of the polycrystalline body having the high specific dielectric constant.

On the other hand, in the side margin portions 17 which do not contribute to the formation of the capacitance, a large amount of calcium can be contained in the A site of the polycrystalline body. Therefore, in the multilayer ceramic capacitor 10, the withstand voltage of the side margin portions 17 is improved by containing a large amount of calcium in the A site of the polycrystalline body constituting the side margin portions 17.

Specifically, in the side margin portions 17, the amount of calcium in the A site is larger than that in the plurality of ceramic layers 20, that is, an atomic ratio R of calcium in the A site is larger than that in the plurality of ceramic layers 20. The atomic ratio R of a specific element is based on the number of atoms of titanium, that is, a ratio of the number of atoms of the element to the number of atoms of titanium contained in the B site.

In the side margin portions 17, the atomic ratio R of calcium in the A site is preferably 0.1 at % or more. On the other hand, in the multilayer ceramic capacitor 10, it is preferable that the atomic ratio R of calcium in the A site is kept at 10 at % or less in order to suppress a decrease in capacitance due to the diffusion of calcium from the side margin portions 17 to the plurality of ceramic layers 20.

Further, in the side margin portions 17, as the amount of calcium in the A site increases, a sintering temperature increases, that is, a gap of the sintering temperature between the side margin portions 17 and the multilayer body 16 increases. In the side margin portions 17, as the timing of sintering becomes slower than that of the multilayer body 16, a large number of pores are formed, so that the intrusion of moisture into the multilayer body 16 is likely to occur.

On the other hand, the side margin portions 17 include silicon (Si). Silicon has an action of lowering the sintering temperature of the side margin portions 17 by forming a molten phase as a glass component during sintering. Therefore, in the multilayer ceramic capacitor 10, the gap of the sintering temperature between the multilayer body 16 and the side margin portions 17 can be reduced.

Thus, in the multilayer ceramic capacitor 10, the timing of sintering of the side margin portions 17 can be aligned with that of the multilayer body 16, so that the pores are less likely to occur in the side margin portions 17. Therefore, in the side margin portions 17, it is possible to suppress the occurrence of intrusion of moisture into the multilayer body 16 along a path passing through the pores.

The side margin portions 17 have a structure in which a plurality of glass particles are dispersed in a polycrystalline body due to the action of silicon. The plurality of glass particles in the side margin portions 17 are mainly composed of an amorphous material and contain silicon as a main component. That is, in the side margin portions 17, silicon is present not in a polycrystalline body but in the plurality of glass particles.

In the side margin portions 17, the plurality of glass particles dispersed in the polycrystalline body have an action of preventing the development of cracks generated in the polycrystalline body. As a result, the occurrence of the cracks penetrating in the thickness direction is suppressed in the side margin portions 17, and the occurrence of intrusion of moisture into the multilayer body 16 through the cracks can be suppressed.

As described above, in the multilayer ceramic capacitor 10, the inclusion of silicon in the side margin portions 17 improves moisture resistance, that is, is less likely to occur lowering of insulation resistance due to the intrusion of moisture into the side margin portions 17. As a result, the multilayer ceramic capacitor 10 can achieve higher reliability.

In the side margin portions 17, in order to sufficiently obtain the action of silicon as described above, the atomic ratio R of silicon to titanium in the B site of the polycrystalline body is preferably 1 at % or more, and more preferably 3.0 at % or more. It is preferable that the content of silicon in the plurality of ceramic layers 20 is smaller than that in the side margin portions 17 in order to secure the capacitance.

On the other hand, in the side margin portions 17, if the content of silicon is too large, the flexibility becomes too high and the flatness of the outer surface is impaired in the manufacturing process, and hence it becomes difficult to maintain a normal shape. Therefore, in the side margin portions 17, it is preferable to keep the atomic ratio R of silicon at 10 at % or less.

In this embodiment, the components of the plurality of ceramic layers 20 and the side margin portions 17 are evaluated in regions other than the boundary regions where the mutual diffusion of the components occurs. That is, the components of the ceramic layer 20 are evaluated in a central region excluding both end portions in the Y-axis direction. The component of the side margin portions 17 is evaluated in a region excluding a portion adjacent to the side surfaces F of the multilayer body 16.

(Other Embodiments)

In the side margin portion 17, strontium may be used instead of the above-mentioned calcium as an element to replace barium in the A site. In other words, strontium titanate ($SrTiO_3$) may be solid-solved with respect to barium titanate. In this configuration, strontium acts in the same manner as calcium, so that the same effect as described above can be obtained.

In this case, in the multilayer ceramic capacitor 10, the atomic ratio R of strontium in the A site in the side margin portions 17 needs to be larger than that in the plurality of ceramic layers 20 in order to achieve both capacitance and reliability. In the side margin portions 17, the atomic ratio R of strontium in the A site is preferably 1 at % or more and 10 at % or less.

In the side margin portions 17, calcium and strontium may be used in combination as an element to replace barium in the A site. That is, calcium titanate and strontium titanate may be solid-solved with respect to barium titanate. In this configuration, the same effect as described above can be obtained by the action of calcium and strontium.

In this case, in the multilayer ceramic capacitor 10, the atomic ratio R of the total of calcium and strontium in the A site in the side margin portions 17 needs to be larger than the atomic ratio R of the total of calcium and strontium in the A site in the plurality of ceramic layers 20. Further, in the side margin portions 17, the atomic ratio R of the total of calcium and strontium in the A site is preferably 1 at % or more and 10 at % or less.

In any of the above cases, in the side margin portions 17, it is preferable that the atomic ratio R of the total of barium, calcium, and strontium in the A site is 95 at % or more and 110 at % or less. Thereby, the polycrystalline body constituting the side margin portions 17 can be made into a more stable perovskite structure.

[Method for Manufacturing Multilayer Ceramic Capacitor 10]

Figure 4:
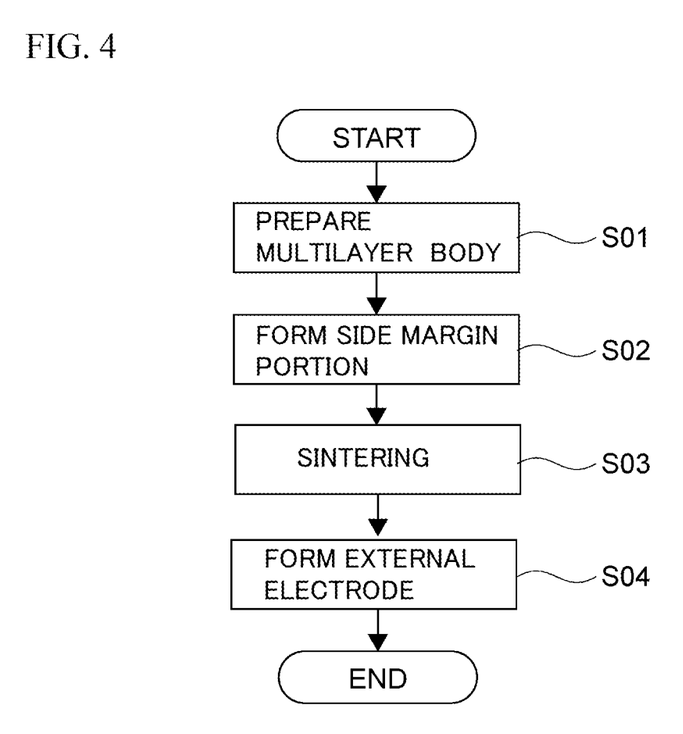
FIG. 4 is a flowchart illustrating a method of manufacturing the multilayer ceramic capacitor.
Figure 5:
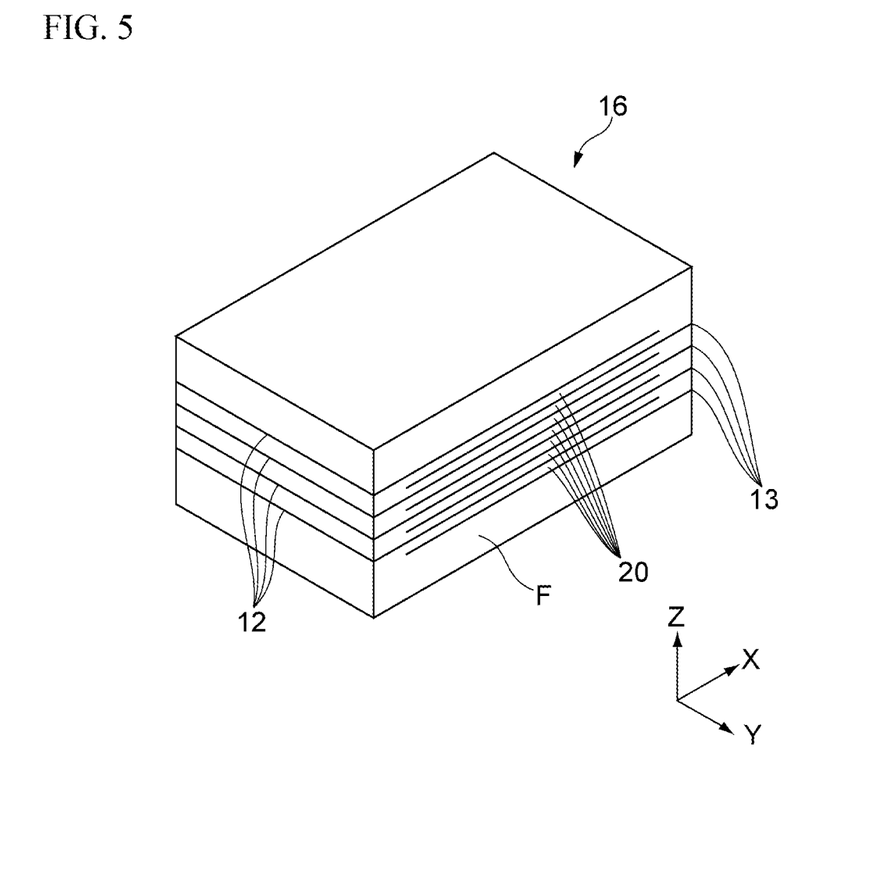
FIG. 5 is a perspective view of an unsintered multilayer body prepared in step S01 of the manufacturing method.
Figure 6:
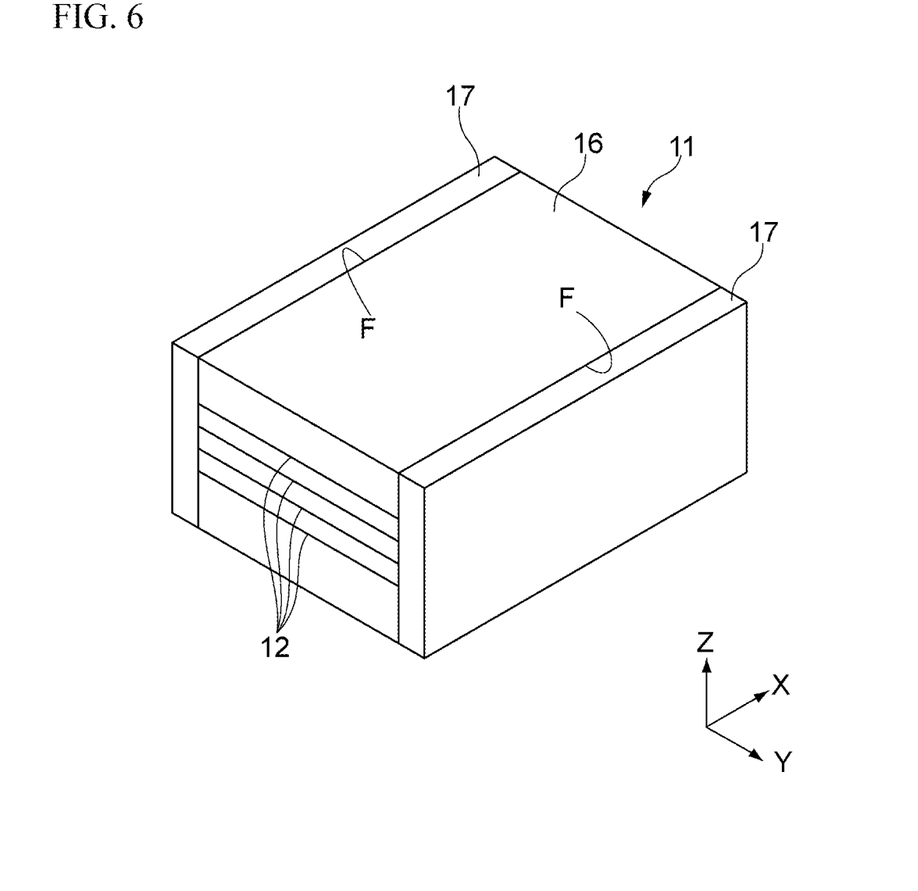
FIG. 6 is a perspective view of an unsintered ceramic body obtained in step S02 of the manufacturing method.

FIG. 4 is a flowchart illustrating a method of manufacturing the multilayer ceramic capacitor 10 according to the present embodiment. FIGS. 5 and 6 are views illustrating a manufacturing process of the multilayer ceramic capacitor 10. Hereinafter, a method of manufacturing the multilayer ceramic capacitor 10 will be described following the flowchart in FIG. 4 and referring to FIGS. 5 and 6 as appropriate.

(Step S01: Preparation of Laminate)

In step S01, an unsintered multilayer body 16 illustrated in FIG. 5 is prepared. The unsintered multilayer body 16 can be produced by using a multilayer sheet in which a plurality of large ceramic sheets are laminated in the Z-axis direction. A conductive paste for forming the internal electrodes 12 and 13 is patterned on the ceramic sheet corresponding to the capacitance forming portion 18.

The component of the ceramic sheet constituting the multilayer sheet can be determined according to the composition of the plurality of ceramic layers 20. In the multilayer sheet, the ceramic sheet corresponding to the pair of cover portions 19 may be composed of different components from those of the ceramic sheets corresponding to the plurality of ceramic layers 20, or may be composed of the same components as the ceramic sheets corresponding to the side margin portions 17, for example.

The unsintered multilayer body 16 can be obtained by cutting the multilayer sheet along the X-Z plane and the Y-Z plane. For cutting the multilayer sheet, for example, a cutting apparatus having a push cutting blade or a rotating blade can be used. Thus, in the multilayer body 16, the pair of side surfaces F is obtained as cut surfaces in which both ends of the internal electrodes 12 and 13 in the Y-axis direction are aligned.

(Step S02: Formation of Side Margin Portions)

In step S02, a pair of unsintered side margin portions 17 are respectively provided on the pair of side surfaces F of the unsintered multilayer body 16 produced in step 01. As a result, as illustrated in FIG. 6, an unsintered ceramic body 11 having a pair of side surfaces constituted by the unsintered side margin portions 17 is obtained.

The side margin portions 17 can be formed by any method. The side margin portions 17 can be formed, for example, by using the ceramic sheet obtained by forming a ceramic slurry into a sheet shape. In this case, for example, the ceramic sheet can be punched out on the side surfaces F of the multilayer body 16 or can be cut in advance and attached to the side surfaces F of the multilayer body 16.

In order to form the side margin portions 17, an unformed ceramic slurry may be used as it is instead of the ceramic sheet previously formed into the sheet shape. In this case, the ceramic slurry can be applied to the side surfaces F of the multilayer body 16 by immersing the side surfaces F of the multilayer body 16, for example.

The component of the ceramic slurry can be determined according to the composition of the side margin portions 17. As an example, in the ceramic slurry, a powder of barium titanate and a powder of calcium oxide (and/or strontium oxide) can be used as components constituting the polycrystalline body, and a powder of silica can be used as components constituting the glass particles.

(Step S03: Sintering)

In step S03, the ceramic body 11 obtained in step S02 is sintered to produce the ceramic body 11 illustrated in FIGS. 1 to 3. When the powder of barium titanate is used as the raw material powder as described above, the barium of barium titanate is replaced with calcium in the side margin portions 17 during the sintering process of the ceramic body 11.

In other words, in the side margin portions 17 at the time of sintering, silicon melts while taking in barium contained in barium titanate as a glass component. Then, calcium enters the A site where barium in barium titanate has been removed. Thus, the action of silicon allows calcium to conform to the A site of the barium titanate.

In the pair of side margin portions 17, it is preferable to add a sufficient amount of silicon in order to replace the total amount of at least one of added calcium and strontium with barium of barium titanate, and more specifically, it is preferable that the atomic ratio R of silicon is larger than the total atomic ratio R of calcium and strontium in the A site.

(Step S04: Formation of External Electrode)

In step S04, the external electrodes 14 and 15 are formed at both ends in the X-axis direction of the ceramic body 11 sintered in step S03, thereby producing the multilayer ceramic capacitor 10 illustrated in FIGS. 1 to 3. The method of forming the external electrodes 14 and 15 in step S04 can be freely selected from known methods.

Thus, the multilayer ceramic capacitor 10 illustrated in FIGS. 1 to 3 is completed. In this manufacturing method, since the side margin portions 17 are formed on the side surfaces F of the multilayer body 16 in which the internal electrodes 12 and 13 are exposed, the positions of ends in the Y-axis direction of the plurality of internal electrodes 12 and 13 in the ceramic body 11 are aligned within a range of 0.5 μm or less in the Y-axis direction.

EXAMPLE

As Examples 1 to 3, samples of multilayer ceramic capacitors having different configurations of ceramic bodies were prepared. The samples according to Examples 1 to 3 have a common configuration other than the configuration described below. As an element for substituting barium in the A-site of barium titanate, calcium was used in Examples 1 and 3, and strontium was used in Example 2.

Example 1

As Examples 1-1 to 1-4 and Comparative Examples 1-1 to 1-3, samples having different atomic ratios R of calcium in the A site in a pair of side margin portions and a plurality of ceramic layers were prepared. The atomic ratio R of calcium in the A site in the pair of side margin portions and the plurality of ceramic layers of each sample is as illustrated in Table 1.

The insulation resistance and the capacitance of each sample were evaluated. Regarding the insulation resistance, a sample having an insulation resistance of 100 MΩ or more was determined to be a good product. Regarding the capacitance, 4.0 g was used as a standard, and a sample having a capacitance of 3.2 g or more and 4.8 μF or less within ±20% of the standard was determined to be the good product. The evaluation results of the insulation resistance and the capacitance are as illustrated in Table 1.

TABLE 1

| | ATOMIC RATIO R OF CALCIUM (at %) | | INSULATION | CAPACI- | |
| --- | --- | --- | --- | --- | --- |
| | SIDE MARGIN PORTION | CERAMIC LAYER | RESISTANCE (MΩ) | TANCE (μF) | DETERMI-NATION |
| EXAMPLE 1-1 | 1 | 0 | 104 | 4.1 | GOOD PRODUCT |
| EXAMPLE 1-2 | 5 | 0 | 157 | 4.0 | GOOD PRODUCT |
| EXAMPLE 1-3 | 10 | 0 | 231 | 3.6 | GOOD PRODUCT |
| EXAMPLE 1-4 | 11 | 0 | 224 | 3.5 | GOOD PRODUCT |
| COMPARATIVE EXAMPLE 1-1 | 0 | 0 | 82 | 4.3 | DEFECTIVE PRODUCT |
| COMPARATIVE EXAMPLE 1-2 | 0 | 5 | 112 | 2.5 | DEFECTIVE PRODUCT |
| COMPARATIVE EXAMPLE 1-3 | 5 | 5 | 162 | 2.4 | DEFECTIVE PRODUCT |

As illustrated in Table 1, the samples according to Examples 1-1 to 1-4 were all determined to be the good products. In the sample according to Example 1-4 in which the atomic ratio R of the calcium in the A site in the side margin portion exceeded 10 at %, the capacitance was slightly lower than that of the samples according to Examples 1-1 to 1-3.

On the other hand, the sample according to Comparative Example 1-1 had an insulation resistance of less than 100 MΩ, and was determined to be a defective product. It is considered that this is because, in the sample according to Comparative Example 1-1, since neither the side margin portions nor the ceramic layers contain calcium, the insulation resistance is reduced due to concentration of the electric field.

In addition, the samples according to Comparative Examples 1-2 and 1-3 had a capacitance of less than 3.2 g and were determined to be the defective products. It is considered that this is because, in the samples according to Comparative Examples 1-2 and 1-3, the plurality of ceramic layers contain calcium equal to or more than that in the side margin portions, thereby causing a decrease in capacitance.

Example 2

As Examples 2-1 to 2-4 and Comparative Examples 2-1 to 2-3, samples having different atomic ratios R of strontium in the A site in the pair of side margin portions and the plurality of ceramic layers were prepared. The atomic ratio R of strontium in the A site in the pair of side margin portions and the plurality of ceramic layers of each sample is as illustrated in Table 2.

The insulation resistance and the capacitance of each sample were evaluated. Regarding the insulation resistance, a sample having an insulation resistance of 100 MΩ or more was determined to be the good product. Regarding the capacitance, 4.0 μF was used as a standard, and a sample having a capacitance of 3.2 g or more and 4.8 g or less within ±20% of the standard capacitance was determined as the good product. The evaluation results of the insulation resistance and the capacitance are as illustrated in Table 2.

TABLE 2

| | ATOMIC RATIO R OF STRONTIUM (at %) | | INSULATION | CAPACI- | |
|---|---|---|---|---|---|
| | SIDE MARGIN PORTION | CERAMIC LAYER | RESISTANCE (MΩ) | TANCE (μF) | DETERMI-NATION |
| EXAMPLE 2-1 | 1 | 0 | 101 | 4.1 | GOOD PRODUCT |
| EXAMPLE 2-2 | 5 | 0 | 137 | 4.0 | GOOD PRODUCT |
| EXAMPLE 2-3 | 10 | 0 | 181 | 3.6 | GOOD PRODUCT |
| EXAMPLE 2-4 | 11 | 0 | 183 | 3.5 | GOOD PRODUCT |
| COMPARATIVE EXAMPLE 2-1 | 0 | 0 | 82 | 4.3 | DEFECTIVE PRODUCT |
| COMPARATIVE EXAMPLE 2-2 | 0 | 5 | 108 | 2.6 | DEFECTIVE PRODUCT |
| COMPARATIVE EXAMPLE 2-3 | 5 | 5 | 142 | 2.5 | DEFECTIVE PRODUCT |

As illustrated in Table 2, the samples according to Examples 2-1 to 2-4 were all determined to be the good products. In the sample according to Example 2-4 in which the atomic ratio R of strontium in the A site in the side margin portions exceeded 10 at %, the capacitance was slightly lower than those of the samples according to Examples 2-1 to 2-3.

On the other hand, the sample according to Comparative Example 2-1 had an insulation resistance of less than 100 MΩ, and was determined to be the defective product. It is considered that this is because, in the sample according to Comparative Example 2-1, since neither the side margin portions nor the ceramic layers contain strontium, the insulation resistance is reduced due to concentration of the electric field.

In the samples according to Comparative Examples 2-2 and 2-3, the capacitance was less than 3.2 μF, and was determined to be the defective products. It is considered that this is because, in the samples according to Comparative Examples 1-2 and 1-3, the plurality of ceramic layers contain strontium equal to or more than that in the side margin portions, thereby causing a decrease in capacitance.

Example 3

Samples relating to Configurations A1 to A8, Configurations B1 to B8, and Configurations C1 to C8 were prepared in which the atomic ratio R of calcium and the atomic ratio R of silicon in the A site in the side margin portions were varied. The atomic ratio R of calcium was 0 at % in the configurations A1 to A8, 2 at % in the configurations B1 to B8, and 5 at % in the configurations C1 to C8.

The respective atomic ratios R of the configurations A1 to A8 are as illustrated in Table 3. Each of the configurations A1 to A8 is a comparative example in that the side margin portions do not contain calcium. In the configurations A1 to A8, the atomic ratio R of silicon in the side margin portions was varied in the range of 0.1 at % or more and 12 at % or less.

The respective atomic ratios R of the configurations B1 to B8 are as illustrated in Table 4. In the configurations B1 to B8, the atomic ratio R of silicon in the side margin portions was varied. Configurations B2 to B7 are all examples. On the other hand, the configuration B1 in which the atomic ratio R of silicon is less than 1 at % and the configuration B8 in which the atomic ratio R of silicon is more than 10 at % are both comparative examples.

The atomic ratios R of the respective configurations C1 to C8 are as illustrated in Table 5. In the configurations C1 to C8, the atomic ratio R of silicon in the side margin portions was varied. Configurations C2 to C7 are all examples. On the other hand, the configuration C1 in which the atomic ratio R of silicon is less than 1 at % and the configuration C8 in which the atomic ratio R of silicon is more than 10 at % are both comparative examples.

The appearance of the side margin portions, the pore ratio of the side margin portion, and the insulation defective ratio were evaluated for the samples of each configuration. Regarding the appearance of the side margin portions, whether or not the shape of the side margin portions was normal was observed with a laser microscope for the samples of each configuration, and a normal sample was evaluated as "a" and an abnormal sample was evaluated as "b". Specifically, a sample in which the dimension in the Y-axis direction of the side margin portions was 25% or more of the central portion in the Z-axis direction at positions adjacent to the internal electrodes located at the outermost layer in the Z-axis direction was determined to be normal.

In order to obtain the pore ratio of the side margin portions, for example, a micro-tissue image obtained by imaging the cross section of the side margin portion with a scanning electron microscope (SEM) can be used. Specifically, the pore ratio of the side margin portion can be obtained as a ratio of an area occupied by the cross-section of the pores to a predetermined region of the micro-tissue image.

In the evaluation of the insulation defective ratio, 1000 samples of each configuration were subjected to a moisture resistance test in which they were held in an environment of 85° C. and 85% humidity for 100 hours. For each configuration, the ratio of samples having an insulation resistance of less than 1 MΩ after the moisture resistance test among 1000 samples was defined as the insulation defective ratio. The evaluation results for each configuration are illustrated in Tables 3 to 5.

TABLE 3

| | CONFIGURATION | ATOMIC RATIO R (at %) | | | PORE | INSULATION DEFECTIVE |
| | | CALCIUM | SILICON | APPEARANCE | RATIO (%) | RATIO |
|---|---|---|---|---|---|---|
| A1 | COMPARATIVE EXAMPLE | 0 | 0.1 | a | 1.21 | 0 |
| A2 | COMPARATIVE EXAMPLE | 0 | 1 | a | 0.16 | 0 |
| A3 | COMPARATIVE EXAMPLE | 0 | 2 | a | 0.11 | 0 |
| A4 | COMPARATIVE EXAMPLE | 0 | 3 | a | 0.08 | 0 |
| A5 | COMPARATIVE EXAMPLE | 0 | 5 | a | 0.1 | 0 |
| A6 | COMPARATIVE EXAMPLE | 0 | 8 | a | 0.08 | 0 |
| A7 | COMPARATIVE EXAMPLE | 0 | 10 | a | 0.09 | 0 |
| A8 | COMPARATIVE EXAMPLE | 0 | 12 | b | 0.06 | 0 |

TABLE 4

| | CONFIGURATION | ATOMIC RATIO R (at %) | | | PORE | INSULATION DEFECTIVE |
| | | CALCIUM | SILICON | APPEARANCE | RATIO (%) | RATIO |
|---|---|---|---|---|---|---|
| B1 | COMPARATIVE EXAMPLE | 2 | 0.1 | a | 10.21 | 100 |
| B2 | EXAMPLE | 2 | 1 | a | 4.78 | 1.5 |
| B3 | EXAMPLE | 2 | 2 | a | 1.38 | 0 |
| B4 | EXAMPLE | 2 | 3 | a | 0.78 | 0 |
| B5 | EXAMPLE | 2 | 5 | a | 0.38 | 0 |
| B6 | EXAMPLE | 2 | 8 | a | 0.18 | 0 |
| B7 | EXAMPLE | 2 | 10 | a | 0.19 | 0 |
| B8 | COMPARATIVE EXAMPLE | 2 | 12 | b | 0.15 | 0 |

TABLE 5

| | CONFIGURATION | ATOMIC RATIO R (at %) | | | PORE | INSULATION DEFECTIVE |
| | | CALCIUM | SILICON | APPEARANCE | RATIO (%) | RATIO |
|---|---|---|---|---|---|---|
| C1 | COMPARATIVE EXAMPLE | 5 | 0.1 | a | 12.43 | 100 |
| C2 | EXAMPLE | 5 | 1 | a | 6.31 | 2.1 |
| C3 | EXAMPLE | 5 | 2 | a | 3.10 | 0.9 |
| C4 | EXAMPLE | 5 | 3 | a | 1.82 | 1 |
| C5 | EXAMPLE | 5 | 5 | a | 0.47 | 0 |
| C6 | EXAMPLE | 5 | 8 | a | 0.28 | 0 |
| C7 | EXAMPLE | 5 | 10 | a | 0.19 | 0 |
| C8 | COMPARATIVE EXAMPLE | 5 | 12 | b | 0.20 | 0 |

As illustrated in Table 3, in any of the configurations A1 to A8 in which the A site in the side margin portions did not contain calcium, the pore ratio was low regardless of the amount of silicon, and no sample having an insulation resistance of less than 1 MΩ was generated after the moisture resistance test. In other words, it can be seen that the problem due to the pore ratio does not occur in the configuration in which the A site does not contain calcium.

On the other hand, as illustrated in Tables 4 and 5, in the configuration in which the A site in the side margin portions contained calcium, the pore ratio tended to decrease as the atomic ratio R of silicon in the side margin portions increased. In particular, regarding the atomic ratio R of silicon, the insulation defective ratio was significantly suppressed at 1 at % or more, and almost no insulation defect occurred at 3 at % or more.

In each of the configurations A8, B8, and C8, the appearance was evaluated as "b", and the side margin portions having normal shapes could not be obtained. It is considered that this is because, in the samples relating to the configurations A8, B8 and C8 in which the atomic ratio R of silicon in the side margin portion exceeds 10 at %, the side margin portions are too flexible to maintain the normal shapes.

In the multilayer ceramic capacitor of the present embodiment, the withstand voltage of the side surfaces of the multilayer body covered by the pair of side margin portions is improved by the action of at least one of calcium and strontium contained in the A site of the polycrystalline body of the perovskite structure constituting the pair of side margin portions. Thus, in the multilayer ceramic capacitor, even if the electric field is concentrated at the ends of the plurality of internal electrodes, defects such as a decrease in insulation resistance are less likely to occur. In the multilayer ceramic capacitor, since the pair of side margin portions contain an appropriate amount of silicon, high sinterability in the pair of side margin portions can be obtained while suppressing a decrease in capacitance. Therefore, in the multilayer ceramic capacitor of the present embodiment, high reliability can be obtained.

OTHER EMBODIMENTS

Although the embodiments of the present invention have been described in detail, it is to be understood that the various change, substitutions, and alterations could be made hereto without departing from the spirit and scope of the invention.

For example, the composition of the polycrystalline body having the perovskite structure constituting the plurality of ceramic layers and the pair of side margin portions can be designed in various ways according to a target performance. That is, the polycrystalline body may contain an element other than barium, calcium, and strontium in the A site and an element other than titanium in the B site.

What is claimed is:
1. A multilayer ceramic capacitor comprising:
a multilayer body including:
a plurality of ceramic layers laminated in a first direction;
a plurality of internal electrodes each positioned between the plurality of ceramic layers; and
a pair of side surfaces perpendicular to a second direction perpendicular to the first direction and on which end portions of the plurality of internal electrodes in the second direction are positioned; and
a pair of side margin portions covering the pair of side surfaces;
wherein each of the plurality of ceramic layers and the pair of side margin portions is composed of a polycrystalline body having a perovskite structure including barium in an A site and titanium in a B site,
wherein the A site in the pair of side margin portions contains strontium, and the atomic ratio of the strontium in the A site to the titanium in the B site in the pair of side margin portions is greater than that in the plurality of ceramic layers,
wherein a plurality of glass particles composed of silicon as a main component are dispersed in the polycrystalline body, and an atomic ratio of silicon to titanium in the B site is 1 at % or more and 10 at % or less.

2. The multilayer ceramic capacitor according to claim 1, wherein
in the pair of side margin portions, the atomic ratio of strontium in the A site to titanium in the B site is 0.1 at % or more and 10 at % or less.

3. The multilayer ceramic capacitor according to claim 1, wherein
the A site in the pair of side margin portions optionally contains calcium, and
in the pair of side margin portions, a total atomic ratio of barium, calcium and strontium in the A site to titanium in the B site is 95 at % or more and 110 at % or less.

4. The multilayer ceramic capacitor according to claim 1, wherein
the atomic ratio of silicon to titanium in the B site in the pair of side margin portions is larger than that in the plurality of ceramic layers.

5. The multilayer ceramic capacitor according to claim 1, wherein
the A site in the pair of side margin portions optionally contains calcium, and
in the pair of side margin portions, the atomic ratio of silicon to titanium in the B site is larger than a total atomic ratio of calcium and strontium in the A site to titanium in the B site.

6. A multilayer ceramic capacitor comprising:
a multilayer body including:
a plurality of ceramic layers laminated in a first direction;
a plurality of internal electrodes each positioned between the plurality of ceramic layers; and
a pair of side surfaces perpendicular to a second direction perpendicular to the first direction and on which end portions of the plurality of internal electrodes in the second direction are positioned; and
a pair of side margin portions covering the pair of side surfaces;
wherein each of the plurality of ceramic layers and the pair of side margin portions is composed of a polycrystalline body having a perovskite structure including barium and titanium,
wherein the pair of side margin portions contain at least one of calcium and strontium, wherein the pair of side margin portions contains strontium, in which the atomic ratio of strontium to titanium is 0.1 at % or more and 10 at % or less, and wherein when the pair of side margin portions contains calcium, an atomic ratio of the calcium to titanium in the pair of side margin portions is greater than that in the plurality of ceramic layers, and when the pair of side margin portions contains strontium, the atomic ratio of the strontium to titanium in the pair of side margin portions is greater than that in the plurality of ceramic layers,
wherein a plurality of glass particles composed of silicon as a main component are dispersed in the polycrystalline body, and an atomic ratio of silicon to titanium is 1 at % or more and 10 at % or less.

7. A multilayer ceramic capacitor comprising:
a multilayer body including:
a plurality of ceramic layers laminated in a first direction;
a plurality of internal electrodes each positioned between the plurality of ceramic layers; and
a pair of side surfaces perpendicular to a second direction perpendicular to the first direction and on which end portions of the plurality of internal electrodes in the second direction are positioned; and a pair of side margin portions covering the pair of side surfaces;

wherein each of the plurality of ceramic layers and the pair of side margin portions is composed of a polycrystalline body having a perovskite structure including barium and titanium, wherein the pair of side margin portions contain at least one of calcium and strontium, when the pair of side margin portions contains calcium, an atomic ratio of the calcium to titanium in the pair of side margin portions is greater than that in the plurality of ceramic layers, and when the pair of side margin portions contains strontium, the atomic ratio of the strontium to titanium in the pair of side margin portions is greater than that in the plurality of ceramic layers, wherein a plurality of glass particles composed of silicon as a main component are dispersed in the polycrystalline body, and an atomic ratio of silicon to titanium is 1 at % or more and 10 at % or less, wherein in the pair of side margin portions, a total atomic ratio of barium, calcium and strontium to titanium is 95 at % or more and 110 at % or less.

8. A multilayer ceramic capacitor comprising:

a multilayer body including:

a plurality of ceramic layers laminated in a first direction;

a plurality of internal electrodes each positioned between the plurality of ceramic layers; and a pair of side surfaces perpendicular to a second direction perpendicular to the first direction and on which end portions of the plurality of internal electrodes in the second direction are positioned; and a pair of side margin portions covering the pair of side surfaces;

wherein each of the plurality of ceramic layers and the pair of side margin portions is composed of a polycrystalline body having a perovskite structure including barium and titanium, wherein the pair of side margin portions contain at least one of calcium and strontium, when the pair of side margin portions contains calcium, an atomic ratio of the calcium to titanium in the pair of side margin portions is greater than that in the plurality of ceramic layers, and when the pair of side margin portions contains strontium, the atomic ratio of the strontium to titanium in the pair of side margin portions is greater than that in the plurality of ceramic layers, wherein a plurality of glass particles composed of silicon as a main component are dispersed in the polycrystalline body, and an atomic ratio of silicon to titanium is 1 at % or more and 10 at % or less, wherein in the pair of side margin portions, the atomic ratio of silicon to titanium is larger than a total atomic ratio of calcium and strontium to titanium.

* * * * *